Figure 1:
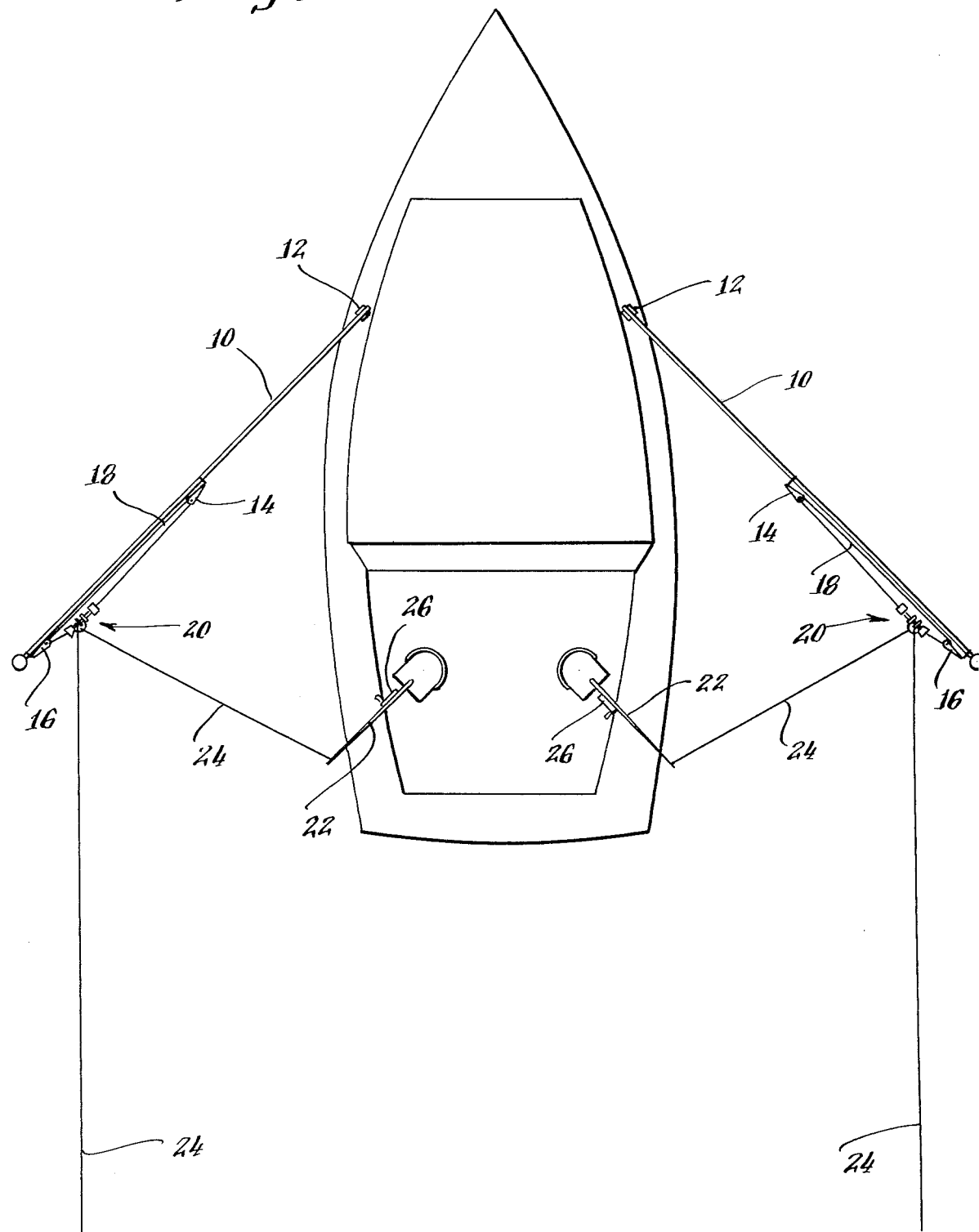

United States Patent [19]
Bart

[11] 3,919,801
[45] Nov. 18, 1975

[54] FISHING EQUIPMENT

[76] Inventor: Philip D. Bart, 30-70 NE. 43rd St., Fort Lauderdale, Fla. 33306

[22] Filed: Jan. 2, 1974

[21] Appl. No.: 430,010

[52] U.S. Cl. .................................. 43/17; 43/43.12
[51] Int. Cl. ............................................. A01k 97/12
[58] Field of Search .......... 43/17, 43.12, 15, 16, 19

[56] References Cited
UNITED STATES PATENTS

| | | | |
|---|---|---|---|
| 1,576,233 | 3/1926 | Cook | 43/16 |
| 2,170,594 | 8/1939 | Nicholson | 43/17 |
| 2,640,290 | 6/1953 | Ames et al. | 43/15 |
| 2,749,648 | 6/1956 | Schneider | 43/17 |
| 2,797,516 | 7/1957 | Suddarth | 43/15 |
| 2,925,682 | 2/1960 | Kravitch | 43/17 X |
| 3,077,048 | 2/1963 | Strumpf | 43/43.12 |

Primary Examiner—Louis G. Mancene
Assistant Examiner—Daniel J. Leach
Attorney, Agent, or Firm—Daniel M. Rosen

[57] ABSTRACT

A release mechanism for use in conjunction with fishing line and constructed of a central shaft having a force loaded member axially positionable along the shaft. A release pin encompassing the fishing line is engaged with the force loading member for placing a predetermined release tension on the fishing line. The shaft further includes an acoustical member mounted thereon and engageable with the force loading member structure after release of the release pin for providing an audible indication of release of the release pin.

13 Claims, 3 Drawing Figures

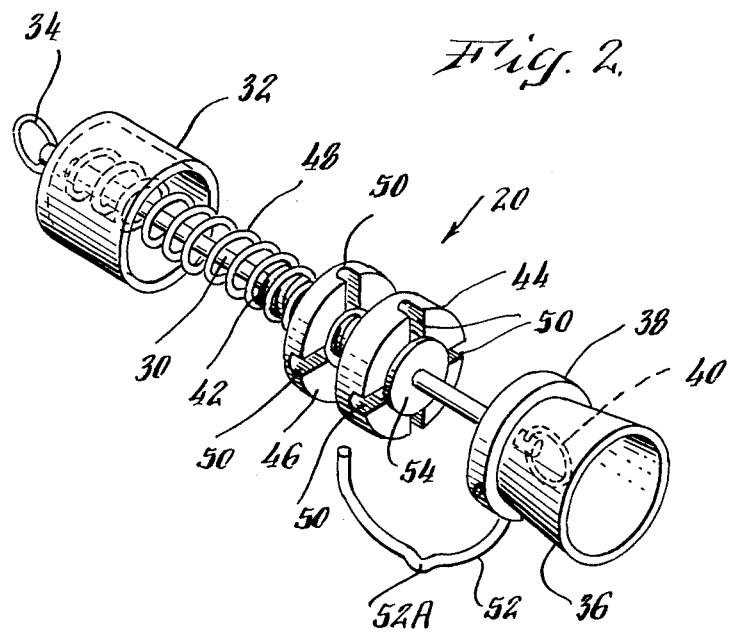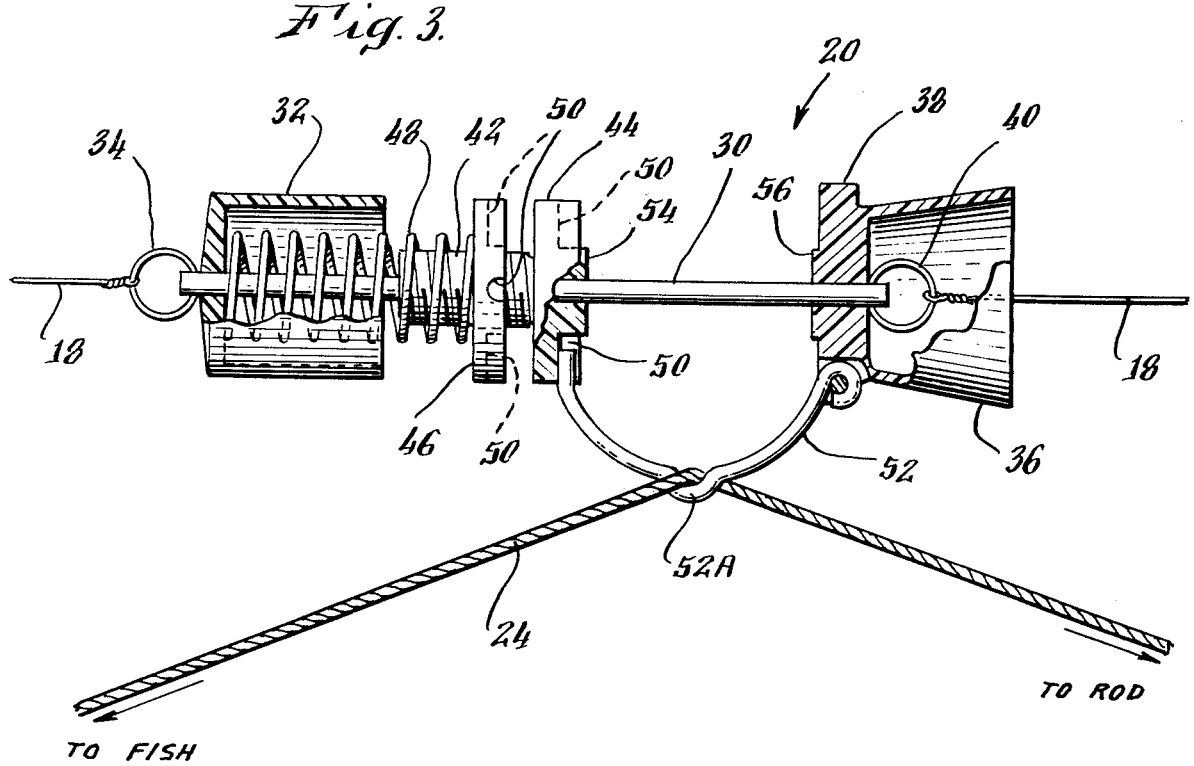

FISHING EQUIPMENT

This invention relates to fishing equipment and more particularly to a release mechanism for positioning and maintaining a fishing line for use with a desired release tension.

As is well known in fishing technique, particularly deep sea fishing, the use of fishing line release mechanisms provide distinct advantages. For example, it is desired to provide a short period of tension free line after a strike to insure that the fish has taken the bait. In addition, the use of release mechanisms on outrigger poles provide a higher degree of freedom from line entanglement where multiple lines are used, raises the line elevation, and allows a greater number of lines to be run from a fishing vessel. Also, the ability of such mechanism to provide an audible release signal is an aid to usage.

Conventional release mechanisms frequently encounter operational difficulty due to entanglement of lines over protruding portions and failure to release due to improper tensioning. Tensioning adjustments of conventional mechanisms have employed screwdriver manipulation or otherwise fine adjustment procedures difficult to achieve on a moving vessel. In addition, the high background noise levels on a trolling vessel makes the audible feature of conventional mechanisms difficult to utilize.

It is therefore the principal object of the present invention to provide a novel and unique construction for a release mechanism which will be efficient in operation and easily employed in use.

It is a further object of the invention to provide a novel and unique construction for a release mechanism which will hold a fishing line with an easily adjustable tension.

It is another object of the invention to provide a novel and unique construction for a release mechanism which will provide an audible warning of a strike.

The foregoing objects are achieved by a construction employing a central shaft having an axially positionable force loading mechanism. A release pin is engageable with the force loading member for placing a tension against the pin. Adjustment of the force loading member permits variation of the force exerted against the pin, thereby varying the release tension holding the fishing line. The pin is shaped to accommodate a fishing line in its engaged position. An acoustic member is mounted to the shaft and is adapted to be forcibly struck by the force loading member after release of the pin for providing an audible warning of the strike and release.

The foregoing objects and brief description, as well as further objects and advantages of the invention will become more apparent from the following more detailed description wherein FIG. 1 illustrates a top view of the use of the invention on a vessel outrigger;

FIG. 2 is a perspective view of the clip of the present invention in its released position; and FIG. 3 is a side view of the clip of the present invention in its tensed or set position.

With reference to FIG. 1, a fishing vessel of any design capable of movement through the water and trolling for fish is shown.

Extending from port and starboard side of the vessel are outrigger supports or poles 10 supported in brackets 12. The poles 10 include sheaves 14 and 16 through which halyard 18 is looped. The release mechanism 20 of this invention is secured to the halyard 18 and thus may be adjustably positioned at any desired point along the length of the pole 10. A fishing rod 22, which may be held by a fisherman or fixed in a boot or the like, is provided with a suitable fishing line 24 wound on a reel 26. The line is held by the release mechanism 20 and passed out to sea. The remote end of the fishing line is provided with suitable bait or lures and hooking devices as is well known. The release mechanism 20 is positioned on the outrigger pole 10 at a point between lines on other poles or trailing off the back of the vessel, to prevent entanglement.

Referring to FIGS. 2 and 3, the release mechanism 20 is illustrated in greater detail.

The release mechanism 20 is formed about a central shaft 30. The shaft 30 may be constructed of stainless steel or other rust proof material. At one end is a protective cup shaped member 32 having a closed end abutting an end-tie loop 34, and which may be manufactured of a corrosion resistant material such as a suitable plastic.

At the other end of shaft 30 is an acoustic member 36 which is formed for acoustic purposes, as a preferably megaphone shaped cup and a lip support 38. A second tie loop 40 is mounted on the shaft end within the member 36 and abuts the inside face of the lip support 38. The members 32, 36 and 38 may be held by the tie loops 34 and 40, or affixed directly to the shaft 30. Force loading is provided by a slidably mounted mechanism on the shaft 30 in the form of an axially positionable threaded bolt 42 having a fixed bolt head 44. Threaded onto the bolt 42 is a disc 46 capable of adjustability linearly along the threaded shaft. The force itself is provided by a spring 48 mounted about the shaft 30 between the inner surface of the protective cup 32 and the disc 46. The spring 48 applies a force to the bolt 44 through the disc 46 for normally maintaining the bolt 44 toward the right hand end of the shaft 30 as shown in the FIGS. 2 and 3.

The disc 46 and head 44 are each positioning faces for the bolt 42, and are provided with a series of radially extending depressions 50 which are each designed to accommodate the end of a release pin 52. The release pin 52 is pivotally mounted at one end thereof to the lip 38 of the acoustic member 36. The release pin 52 is rounded in shape, with a slight central depression 52A. In use, the depression 52A serves to fix the line 24 in proper position without lateral movement.

In operation, the release mechanism 20 is secured to the halyard 18 of the outrigger pole 10. The release mechanism 20 may be secured by tying the ends of the halyard to the respective tie loops 34 and 40, as shown in FIGS. 1 and 3.

The fishing line is then passed within the curve of the release pin 52. The bolt 42 is then forced back against the spring 48 until the end of the release pin 52 can be placed into engagement with the appropriate depression 50 for the desired loading force. It should be apparent that placing the pin end into a depression on the surface of the head 44 will place a greater force against the release pin 52 than would be realized if the pin were placed in a depression in the disc 46. The force may be adjusted by rotating the threaded bolt 42 relative to the disc 46 to raise or lower the position of the bolt head 44 relative to the disc 46.

As is evident in FIG. 3, rotating the head 44 relative to the disc 46 such that the disc 46 is close to the head 44 will result in the least force applied by the spring 48 against the disc 46 when the pin 52 is inserted into a depression 50 of the head 44. If the disc 46 is positioned at the end of the bolt 42 remote from the head, spring 48 will be at its maximum compression with pin 52 inserted into a depression 50 on the head 44, thereby applying maximum force loading. It should be noted that the spring compression, and the resultant force loading, with the pin 52 in a depression 50 of the disc 46 will be the same regardless of the disc 46 position on the threaded bolt 42.

With the pin 52 in position in a depression 50 on the head 44, the loading force on the pin 52 can be adjusted by rotating the disc 46. Thus, while the release mechanism is in actual use, a tension adjustment can be made without releasing the line 24, merely by using the depressions 50 on the head 44 to hold the release pin, as shown in FIG. 3.

The release mechanism 20 can then be run up the outrigger pole 10 (FIG. 1) to place the line in a desired position. It is preferred that the mechanism 20 be arranged with the acoustic member 36 at the highest or furthest outboard point. The effect of this configuration will be to permit release of the release pin 52 to pivot away from the source of the line 24, thereby permitting the line 24 to more easily clear the opening formed as the release pin 52 moves to clear the depression in the head or disc.

When a strike is made, the initial force or pull on the line 24 (FIG. 3) will be sufficient to overcome the force placed upon the release pin 52 by the spring 48, thus pulling the release pin 52 clear of its associated head or disc depression. The force of the now released spring 48 will drive the bolt 42 and its associated head and disc along the shaft 30 toward the acoustic member 36. To utilize the acoustic properties of the preferably megaphone shaped acoustic member 36, the head 44 is provided with a smooth facing segment 54. The back surface of the lip support 38 is provided with a similar facing segment 56. The force of the spring 48 will be sufficient to cause the facing segment 54 to strike the segment 56, causing an acoustic signal to be generated through the acoustic member 36, thereby generating a relatively high volume audible warning noise.

As will be evident from FIG. 1, release of the line 24 will cause a momentary slack until the line is tensed by the fishing rod 22 and reel 24. The momentary slack is important in allowing the fish to take the bait, as set forth above. In addition, the audible warning at the moment of release allows the fisherman to reach the rod in time to play the fish.

It will be evident that the functional features of the invention allow for various alternatives without departing from the inventive concept. For example, the radial depressions in the head 44 and disc 46 can be varied in number and shape to accommodate the release pin end. Additionally, the release pin shape can be varied to advantage, although the shape of the pin 52 shown herein is preferred. Further, the release mechanism 20 need not be tied to the halyard by means of the tie loops, but can be affixed thereto by any suitable means. Also, the release mechanism 20 can be reversed on the halyard, and employed in the reverse direction.

The release mechanism may be constructed of any suitable materials, but preferably should be corrosion resistant. Thus, the bolt and head, disc, acoustic member and support and protective cup can all be a high impact or other suitable plastic material, and the central shaft, spring and release pin of brass or stainless steel or the like. Other substitution of materials may obviously be employed to advantage.

Thus, the construction of the release mechanism as described above provides a fishing line tension adjustability permitting both various types of fishing techniques and various targets to be achieved. In addition, line entanglement is minimized and rapid deployment of the mechanism is realized, due to the construction employed.

Finally, a relatively high volume audible warning feature is provided with a reliable mechanical operation.

Although the invention has been described with reference to a preferred embodiment, it will be understood that various alternatives and variations may be achieved without departing from the spirit and scope of the present invention.

What is claimed is:

1. A release mechanism for releasing a fishing line comprising a central shaft, force loaded means axially positionable along said shaft, and a release pin engageable with said force loaded means and retaining a fishing line in said engageable position, said force loaded means placing a force on said release pin determined by said force loading, said release pin releasing said fishing line from said engagement when said fishing line exerts sufficient release force upon said pin to overcome said force loading.

2. The mechanism of claim 1 wherein said force loaded means is adjustable for varying the force exerted by said force loaded means against said release pin.

3. The mechanism of claim 1 wherein said shaft includes an acoustic member mounted thereon, said force loaded tensioning means being adapted to forcibly strike said acoustic member upon disengagement of said release pin for providing an audible indication of said disengagement of said release pin from said force loaded means.

4. The mechanism of claim 3 wherein said acoustic member is megaphone shaped.

5. The mechanism of claim 3 wherein said acoustic member fixedly supports one end of said release pin.

6. The mechanism of claim 1 wherein said release pin is rounded and includes a depression for engaging said fishing line therein.

7. An outrigger release mechanism employed to hold a fishing line with a predetermined tension on an outrigger pole extending from a fishing vessel, said release mechanism comprising a central shaft, a force loading member axially positioned on said shaft, loading means for placing a variable force against said force loading member, said force loading member including a positioning face, an acoustic member mounted on said shaft, a pivotally mounted release pin having one fixed pivoted end and a second free end, said release pin having two positions including a first position accommodating said fishing line and having its free end engageable with said positioning face against the force of said loading means, and a second position releasing said fishing line and the force of said loading means against said force loading member, said loading means having sufficient force to move said force loading member along said shaft to said acoustic member, said acoustic member producing an audible warning noise upon being struck by said released force loading member, thereby indicating release of said fishing line.

8. The release mechanism of claim 7 wherein said force loading member includes a threaded shaft, a head affixed thereto, and a disc threaded thereon, said head and disc each including a forward facing portion comprising said positioning faces, said force being applied against said disc, said disc being linearly adjustable on said threaded shaft and engageable with said release pin for placing a fixed force on said release pin, and wherein said head is also engageable with said release pin, and said disc is lineally adjustable for varying the force applied along said shaft by said loading means against said release pin.

9. The release mechanism of claim 8 wherein each said positioning face includes a plurality of radial depressions for accommodating the free end of said release pin.

10. The release mechanism of claim 7 wherein said loading means is a coil spring.

11. The release mechanism of claim 7 wherein said positioning face includes a first smooth facing segment, and said acoustic member includes a second smooth facing segment, said facing segments forcibly engaging each other to provide said audible warning noise.

12. The release mechanism of claim 7 wherein said shaft further includes a protective cup surrounding at least a portion of said loading means.

13. The release mechanism of claim 7 wherein said release pin is rounded in form and includes a central depression for fixing said fishing line in position.

* * * * *